United States Patent
Karlsson et al.

(10) Patent No.: US 8,145,408 B2
(45) Date of Patent: Mar. 27, 2012

(54) PROCEDURE FOR CHECKING THE FUNCTIONALITY OF A METERING VALVE OF A NOX-REDUCTION SYSTEM OF A COMBUSTION ENGINE

(75) Inventors: Niclas Karlsson, Esslingen Am Neckar (DE); Martin Czasch, Winnenden (DE); Lars Wonnemann, Higashimatsuyama (JP); Thomas Lorenz, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 214 days.

(21) Appl. No.: 12/611,573

(22) Filed: Nov. 3, 2009

(65) Prior Publication Data
US 2010/0114455 A1    May 6, 2010

(30) Foreign Application Priority Data

Nov. 4, 2008   (DE) .................... 10 2008 043 469

(51) Int. Cl.
*F01N 3/10* (2006.01)
*F02D 41/22* (2006.01)

(52) U.S. Cl. ..... 701/104; 701/107; 123/480; 123/198 A; 60/301; 60/303

(58) Field of Classification Search .................. 701/106, 701/107, 110; 123/514, 510, 511, 480, 457, 123/446, 1 A, 198 A; 60/274, 285, 286, 295, 60/301, 303
See application file for complete search history.

(56) References Cited

U.S. PATENT DOCUMENTS

| | | | |
|---|---|---|---|
| 5,665,318 A * | 9/1997 | Rembold et al. | 422/177 |
| 6,209,315 B1 * | 4/2001 | Weigl | 60/274 |
| 7,438,052 B2 * | 10/2008 | Awano et al. | 123/456 |
| 2008/0302089 A1 * | 12/2008 | Way et al. | 60/286 |
| 2009/0105928 A1 * | 4/2009 | Mueller et al. | 701/103 |

* cited by examiner

*Primary Examiner* — Hai Huynh
(74) *Attorney, Agent, or Firm* — Merchant & Gould P.C

(57) ABSTRACT

A procedure for checking the functionality of a metering valve (310) of a reducing agent system of a combustion engine, at which the metering device (105) is advanced from a tank (100) to the metering valve (310) with the aid of a controllable pump (12) at a constant pressure, comprising the metering valve (310) is impinged with a control variable that characterizes the causing of a status change of the metering valve (310), a variable is detected that characterized the flow rate of the pump (120), from this variable that characterizes the flow rate the functionality of the metering valve (310) is assumed.

7 Claims, 1 Drawing Sheet

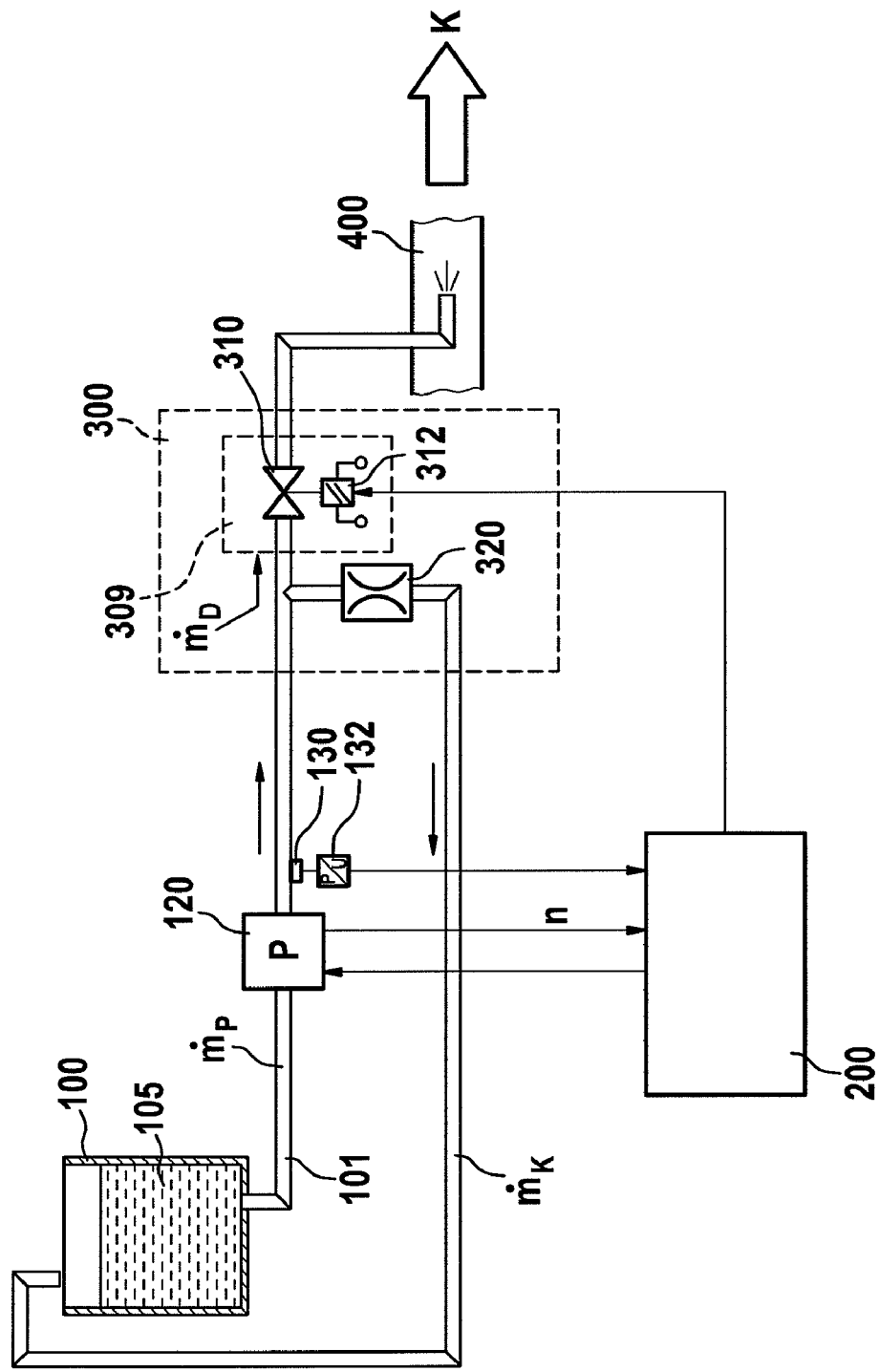

PROCEDURE FOR CHECKING THE FUNCTIONALITY OF A METERING VALVE OF A NOX-REDUCTION SYSTEM OF A COMBUSTION ENGINE

This application is claims benefit of Ser. No. 10 2008 043 469.8, filed 4 Nov. 2008 in Germany and which application is incorporated herein by reference. To the extent appropriate, a claim of priority is made to the above disclosed application.

TECHNICAL FIELD

The invention relates to a procedure for checking the functionality of a metering valve of a NOx-reduction system of a combustion engine according to the generic term of claim 1.

Subject matter of the present invention is also a computer program and a computer program product, which qualify for implementing the procedure.

BACKGROUND

The reduction of nitric oxide emissions of a combustion engine that works with oxygen surplus, in particular a diesel combustion engine, can take place with the aid of the so-called selective-catalytic-reduction technology (SCR). A reduction of nitric oxides into nitrogen and hydrogen is thereby carried out, whereby gaseous ammoniac or ammoniac in aqueous solution or urea in aqueous solution are used as reducing agent. The urea serves thereby as ammoniac carrier. With the aid of the metering system in front of a hydrolysis catalytic converter the reducing agent is injected into the exhaust gas pipe of the combustion engine. It is converted in the hydrolysis catalytic converter with the aid of the hydrolysis into ammoniac, which then further reduces the nitric oxides in the exhaust gas in the main SCR-catalytic converter, which is also called DENOX-catalytic converter. The main components of such a NOx-reduction system are a reducing agent tank, a pump, a pressure regulator, a pressure sensor and a metering valve. The pump advances the reducing agent that is stored in the reducing agent tank to the metering valve, with which the reducing agent is injected into the exhaust gas current upstream of the hydrolysis catalytic converter. The metering valve is thereby controlled by signals of a control unit, for example the control unit of the combustion engine, in order to supply a specific actually required amount of reducing agent. Substances that are present in aqueous solution and releasing ammoniac, such as urea, are preferably used, because they store reducing agent significantly easier and are easier to handle than for example gaseous ammoniac. Furthermore the ability to advance and meter this solution is technically significantly easier than for example the advancing and metering of gaseous substances. A disadvantage of the aqueous solution of for example urea is that the reducing agent solution has a freezing point of −11° C. Therefore devices have to be provided for heating the reducing agent in the reducing agent tank.

Because the NOx-reduction systems are an exhaust gas relevant part, failures, for example leaks and such alike, have to be detected. Previous leakage detection procedures evaluate the pressure in the SCR-systems either statistically or dynamically for the leakage detection and compare this pressure with absolute, constant default threshold values. In order to exclude here erroneous diagnoses every maximally possible tolerance has to be considered. Thereby the detection acuity is reduced in such a way that only bigger leakages are detected. Such a leakage detection qualifies basically only as "pipe tear off detection", thus as a procedure for detecting whether a pipe interruption has taken place. It is extremely problematic at the previous procedure to detect an open clamped metering valve.

SUMMARY

By the procedure for checking the functionality of a metering valve with the characteristics of claim 1 it is very advantageously possible by a technically simple way to detect the functionality of the metering valve and therefore to check it. The basic idea of the invention is to implement the checking of the functionality of the metering valve with the aid of the relative change of the volume current when operating the metering valve. Therefore a variable that is characterizing the flow-rate of the pump, for example the pump engine speed, which means the engine speed of the pump engine of the pump, is evaluated and due to a change of that variable, for example an engine speed change, the functionality is assumed.

The advantage of this procedure is its simple realization and its high error detection precision.

Thus one advantageous embodiment provides for example a periodic checking of the functionality during the operation of the NOx-reduction system. The checking of the functionality takes thereby place periodically during the driving operation. Periodically means thereby that check cycles are carried out and evaluated.

According to an advantageous embodiment of the procedure the metering valve is impinged with control signals, which correspond with the nominal amounts of the metering device that has to be metered. The variable that characterizes the flow rate, for example the engine speed of the metering device pump is thereby detected. Thus test dosages are virtually carried out. Those test functions can for example take place always at the beginning of a normal metering operation once per driving cycle. By this means a checking of the metering valve is possible at the start of the NOx-reduction system.

According to an advantageous embodiment of the procedure a learning phase can be realized. Thereby a learning procedure is started per driving cycle after checking the mobility of the metering valve, which takes place by a targeted controlling and evaluating of the response behavior of the metering valve with the aid of the signal that characterizes the flow rate, thus for example the engine speed signal, at which the metering valve is initially impinged with a closing signal and then a reference flow rate, for example a reference pump engine speed is detected at the closed metering valve.

Due to this learning function reference values are determined, which enable a clear limitation of the error tolerance at the checking of the functionality.

BRIEF DESCRIPTION OF THE DRAWING

The FIGURE schematically shows a NOx-reduction system for a combustion engine.

DETAILED DESCRIPTION

The FIGURE shows a NOx-reduction system of a (not shown) combustion engine, whereby only the elements f such a reduction system are shown that a relevant for the invention.

A tank 100 stores a reducing agent solution, for example a urea-water solution 105, which is also sold under the product name "AdBlue". The urea-water solution 105 is advanced over a line 101 with the aid of a pump 120 to a metering valve

300 (pump mass current $m_p$), through which it is injected in front of the catalytic converter K into the exhaust gas pipe 400 (metering mass current $m_D$).

The pressure in the NOx-reduction system is detected by a pressure sensor 130, which is arranged in the line 101. The signal is converted in the pressure voltage converter 132 and delivered to a control unit 200, for example an engine control unit. With this control unit 200 the pump 120 can also be controlled in such a way that the pressure in the NOx-reduction system is kept constant. If for example a drain of the reducing agent takes place over the metering device unit 300 to the exhaust gas the pump 100 is controlled in such a way, that the engine speed increases, whereby the reducing agent is advanced from the tank 100 and thus the pressure in the NOx-reduction system is kept constant. The metering valve unit 300 provides the actual metering valve 310, which can be controlled by the control unit 200 over an electromagnet 312, which is arranged together with the metering valve 310 in a housing 309, as well as a throttle 320, which is arranged in a return pipe 103, which leads back to the tank 100 and enables a return of the reducing agent into the tank 100 (return mass current $m_k$). This return pipe 103 serves for cooling the metering valve, which is arranged directly in front of the catalytic converter K in the hot exhaust gas.

Subsequently a procedure for checking the functionality of the metering valve 310 is further explained. Initially it is checked in a first step whether the metering valve can be moved. Therefore it is impinged by the control unit 200 with a signal, which moves the valve 310 in an opened- and closed position. The engine speed n of a pump engine of the pump 120 is thereby detected and evaluated in the control unit 200. This is also schematically shown by a signal arrow n in the FIGURE.

The engine speed has to reach or exceed default threshold values during a defined controlling of the metering valve 310. If that is the case the metering valve 310 is controlled to be closed and the engine speed n of the pump engine is detected in the closed status. That engine speed n serves as reference pump engine speed. The previously mentioned steps can also be termed as learning function or "learning phase" of the metering unit 300.

It shall be clearly noted here that instead of the engine speed also another variable that characterizes the flow rate of the pump 120 can be detected. In that case it is checked whether the variable reaches or exceeds a default threshold value during the defined controlling of the metering valve 310. If that is the case the metering valve 310 is controlled to be closed, as described previously, and the variable, which characterizes the flow rate of the pump 120 is detected in closed state. This variable is used as reference variable and for example stored in a storage of the control unit 200.

During the operation of the metering system 300 a continuous, periodical controlling takes place. Therefore the metering valve 310 is for example always at the beginning of the regular metering operation once per driving cycle impinged with a test impulse. This test impulse activates a test metering. At a functioning metering valve 310 the simultaneously detected engine speed n of the pump engine has reach a default value within default limits.

If that value is reached within the default limits a functioning metering valve 310 is assumed. If it is not reached a not functioning metering valve 310 is assumed. The nominal amount default is assigned to a change of the pump engine speed n. with other words it is checked whether the pump engine speed n has changed within default variables if the nominal amount of the urea-water solution that has to be metered varies between default variables.

If the engine speed variation is big enough a functioning NOx-reduction system is assumed. If the engine speed variation and therefore the volume current change is smaller than an expected minimum value it is assumed that the metering system is defect and in particular that the metering valve 310 has become immovable since its previous learning process. Thereby it cannot be determined at first whether the metering valve 310 is clamping in the closed position or whether it clamps in the opened position or half-opened or half-closed position. If the last determined engine speed is close to the learned idle engine speed, it can be assumed that the mass current stagnates on a low level. That means that the metering valve 310 clamps being closed. If the system on the other hand does not react anymore dynamically and if the determined engine speeds are higher than the idle engine speed of the system it has to be assumed that a permanent advancing takes place on a higher level. That can either mean that the metering valve clamps being opened or for example that a line break down took place. At a closed clamping metering valve 210 on the other hand pressure is still built up in the NOx-reduction system, because an emission of the urea-water solution has not to be feared. An error message is send to the operator with the content that no SCR-operation, which means no nitric oxide reduction is possible. At an opened clamping valve 310 on the other hand a pressure reduction in the reduction system is carried out immediately and simultaneously an error message is send out.

As it has been previously mentioned another variable that characterizes the flow rate of the pump 120 can be used instead of the engine speed for checking the functioning of the metering valve 310 and therefore the entire reducing agent system.

The invention claimed is:

1. A Procedure for checking the functionality of a metering valve of a reducing agent system of a combustion engine, wherein a reducing agent is advanced from a tank to the metering valve with the aid of a controllable pump at a constant pressure, comprising:

impinging the metering valve with a control variable characterizing an evocation of a status change of the metering valve;

ascertaining that the variable characterizes a flow rate of the reducing agent through the pump; and determining the functionality of the metering valve from the variable characterizing the flow rate.

2. The procedure according to claim 1, wherein the pump engine speed of the pump is detected as variable that characterized the flow rate of the pump.

3. The procedure according to claim 1, wherein the checking takes periodically place during the operation of the reducing agent system.

4. The procedure according to claim 1, wherein the ability of the metering valve to operate is at first assumed by controlling the metering valve with a signal wherein the causing of a change of the operating status, detecting the variable wherein the flow rate, in particular the engine speed of the pump and comparing the detected flow rate values, in particular the engine speed values with comparative values and in that in the case of a proper opening and closing of the metering valve a variable is then detected at a closed metering valve wherein the flow rate, in particular the engine speed (n) of the pump and is stored as reference variable (learning phase).

5. The procedure according to claim 1, wherein the metering valve is impinged with control signals, which correspond with the nominal quantities of the metering device that has to be metered, and in that thereby a variable is detected wherein the engine speed (n) of the metering pump and it is compared to default comparative values and in the case of deviations a defect of the metering valve is assumed.

6. A computer program, which carries out all steps of a procedure according to claim 1, if it runs on an arithmetic unit, in particular a control unit of the combustion engine.

7. A computer program product with program code, which is stored on a machine-readable medium, for implementing the procedure according to claim 1, if the program is carried out on a computer or a control unit of the combustion engine.

* * * * *